(12) United States Patent
Gonsalves

(10) Patent No.: US 12,656,139 B1
(45) Date of Patent: Jun. 16, 2026

(54) SYSTEM AND METHOD FOR PROVIDING ROUTE GUIDANCE

(71) Applicant: John Paul Gonsalves, Falls Church, VA (US)

(72) Inventor: John Paul Gonsalves, Falls Church, VA (US)

( * ) Notice: Subject to any disclaimer, the term of this patent is extended or adjusted under 35 U.S.C. 154(b) by 100 days.

(21) Appl. No.: 18/534,667

(22) Filed: Dec. 10, 2023

(51) Int. Cl.
*G01C 21/34* (2006.01)

(52) U.S. Cl.
CPC ..... *G01C 21/3484* (2013.01); *G01C 21/3461* (2013.01)

(58) Field of Classification Search
CPC ............ G01C 21/3423; G01C 21/3484; G01C 21/3461; G01C 21/3453; G01C 21/3617
See application file for complete search history.

(56) References Cited

U.S. PATENT DOCUMENTS

| | | | |
|---|---|---|---|
| 10,240,939 B2 | 3/2019 | Kitchel | |
| 10,323,948 B2 | 6/2019 | Kitchel et al. | |

| | | | |
|---|---|---|---|
| 10,429,192 B2 | 10/2019 | Kitchel | |
| 10,515,101 B2 | 12/2019 | Robb | |
| 11,623,121 B1 | 4/2023 | Robb | |
| 2013/0046465 A1* | 2/2013 | Serbanescu ............ | G01C 21/34 |
| | | | 701/527 |
| 2017/0268892 A1* | 9/2017 | Singh ................. | G01C 21/3423 |
| 2018/0135990 A1* | 5/2018 | Zhang ................ | G01C 21/3492 |
| 2020/0132494 A1* | 4/2020 | Majima .............. | G01C 21/3484 |

* cited by examiner

*Primary Examiner* — Kenneth J Malkowski

(57) ABSTRACT

The techniques described herein provide route guidance, based on an individual traveller's preferences, the type of vehicle, and various safety and other factors. For example, some embodiments of the present invention consider the amount of gas available in a gas-powered automobile in suggesting routes that pass near a gas station before the automobile is expected to run out of gas. Some embodiments of the present invention consider the amount of diesel fuel remaining in a diesel-powered automobile in suggesting routes that pass near a station selling diesel fuel before the automobile is expected to run out of gas. Some embodiments of the present invention consider the amount of charge available in the batteries of an electric powered automobile in suggesting routes that pass near an electric charging station before the automobile is expected to run out of charge. Some embodiments consider the condition of the roads in suggesting routes that avoid roads that are covered with ice, snow, potholes, etc. or are under construction.

12 Claims, 6 Drawing Sheets

200

<u>300</u>

302 | Determine candidate routes for electric car

304 | request information about candidate routes for electric car

306 | Compute scores based on information and weights

308 | send candidate routes with the highest scores to user

310 | receive route selected by user

312 | Send information about selected route to user

400

402   Determine candidate routes for bicycle 404   request information about candidate routes for bicycle 406   Compute scores based on information and weights 408   send candidate routes with the highest scores to user 410   receive route selected by user 412   Send information about selected route to user

500

502    Determine candidate routes for walker 504    request information about candidate routes for walker 506    Compute scores based on information and weights 508    send candidate routes with the highest scores to user 510    receive route selected by user 512    Send information about selected route to user 602 Start _____          604 End _____          606 Mode _____

608 Factors: _____    _____   _____  _____   _____  _____

610 Weights: _____    _____   _____  _____   _____   _____

612 Candidate Routes                              614 Scores

SYSTEM AND METHOD FOR PROVIDING ROUTE GUIDANCE

TECHNICAL FIELD

The techniques described herein relate generally to a system and method for providing route guidance for various modes of transportation.

BACKGROUND OF INVENTION

Various products exist for providing route guidance to people traveling from one location to another. But these conventional products fail to consider various factors that are important to travelers and fail to tailor the route guidance to the particular preferences of an individual traveler. Rather, these conventional products typically consider only an estimated travel time and toll fees and provide the same route suggestions to all users. Accordingly, there exists a need for a system and method that provides route guidance based on an individual traveler's preferences, the type of vehicle (e.g., gas car, electric vehicle, motorcycle, bicycle), various safety and other factors, etc.

The present invention includes a system and method for providing route guidance based on an individual traveler's preferences, the type of vehicle, and various safety and other factors.

SUMMARY OF INVENTION

In accordance with the disclosed subject matter, systems and methods are provided, such as for providing route guidance, based on an individual traveler's preferences, the type of vehicle, and various safety and other factors.

For example, in one aspect of the invention, an electronic device for providing route guidance comprises at least one processor and at least one non-transient memory electrically connected to said processor, said memory comprises code that when executed performs the steps of: displaying an interface to a user wherein the interface display includes one or more of the following: a first field receiving from the user a starting location; a second field receiving from the user an ending location; a third field receiving from the user a mode of transportation wherein the mode of transportation comprises one of the following: a gas-powered vehicle, a diesel-powered vehicle, an electric powered vehicle, a bicycle, and walking; a plurality of fourth fields receiving from the user a plurality of factors important to the user wherein if the received mode of transportation is a bicycle, the plurality of factors important to the user comprises conditions of roads along the candidate routes, a number and severity of accidents to bicyclists on the roads along the candidate routes, the scenery on the roads along the candidate routes, crime rates along the candidate routes, an availability of bicycle repair stations along the candidate routes, and an availability of air filling stations along the candidate routes; a plurality of fifth fields receiving from the user a plurality of weights corresponding to the plurality of factors important to the user; a plurality of sixth fields receiving from a server a plurality of candidate routes; and a plurality of seventh fields receiving from the server a plurality of utility scores corresponding to the plurality of candidate routes; and receiving, from the user, a selection of at least one of the plurality of candidate routes.

In some embodiments, if the received mode of transportation is a bicycle, the plurality of factors important to the user further comprises an availability of dedicated bicycle paths along the candidate routes, an availability of water fountains along the candidate routes, an availability of crosswalks along the candidate routes, and an availability of traffic lights at intersections along the candidate routes.

In some embodiments, if the received mode of transportation is a gas-powered vehicle, the plurality of factors important to the user comprises the conditions of the roads along the candidate routes, a number and severity of car accidents on the roads along the candidate routes, the scenery on the roads along the candidate routes, rates of car jackings along the candidate routes, and an availability of gas stations along the candidate routes.

In some embodiments, if the received mode of transportation is an electric-powered vehicle, the plurality of factors important to the user comprises conditions of the roads along the candidate routes, a number and severity of car accidents on the roads along the candidate routes, the scenery on the roads along the candidate routes, the rates of car jackings along the candidate routes, an availability of electric charging stations along the candidate routes, a cost of the electric charging stations along the candidate routes, and a charging speed of the electric charging stations along the candidate routes.

In some embodiments, if the received mode of transportation is walking, the plurality of factors important to the user comprises conditions of the roads along the candidate routes, a number and severity of accidents to walkers on the roads along the candidate routes, the scenery on the roads along the candidate routes, and rates of muggings along the candidate routes. In some embodiments, if the received mode of transportation is walking, the plurality of factors important to the user comprises rates of murders along the plurality of candidate routes, rates of violent crimes along the plurality of candidate routes, rates of thefts along the plurality of candidate routes, rates of rapes along the plurality of candidate routes, rates of kidnappings along the plurality of candidate routes, an availability of police stations along the candidate routes, an availability of water along the candidate routes, an availability of food along the candidate routes, an availability of sidewalks along the candidate routes, an availability of crosswalks along the candidate routes, and an available of traffic lights at intersections along the candidate routes.

In another aspect of the invention, a method for providing route guidance to users having different modes of transportation, comprises: sending, to a user, a query requesting a starting location, an ending location, an identification of the mode of transportation wherein the mode of transportation comprises one of the following: a gas-powered vehicle, a diesel-powered vehicle, an electric powered vehicle, a bicycle, and walking; receiving, from the user, the starting location, the ending location and the identification of the mode of transportation; determining a plurality of candidate routes between the starting location and the ending location; receiving, from the user, a plurality of factors important to the user; if the received mode of transportation is a bicycle, the plurality of factors important to the user comprises conditions of roads along the candidate routes, a number and severity of accidents to bicyclists on the roads along the candidate routes, the scenery on the roads along the candidate routes, crime rates along the candidate routes, an availability of bicycle repair stations along the candidate routes, and an availability of air filling stations along the candidate routes; receiving, from the user, a plurality of weights corresponding to the plurality of factors important to the user; determining a plurality of values corresponding to the plurality of factors; determining a plurality of scores corresponding to the plurality of candidate routes by evaluating a utility function as product of the plurality of values of the plurality of factors and the corresponding plurality of weights; sending the plurality of scores corresponding to the plurality of candidate routes to the user; and receiving a selection of one of the plurality of candidate routes from the user.

In some embodiments, if the received mode of transportation is a bicycle, the plurality of factors important to the user further comprises an availability of dedicated bicycle paths along the candidate routes, an availability of water fountains along the candidate routes, an availability of crosswalks along the candidate routes, and an availability of traffic lights at intersections along the candidate routes.

In some embodiments, if the received mode of transportation is a gas-powered vehicle, the plurality of factors important to the user comprises the conditions of the roads along the candidate routes, a number and severity of car accidents on the roads along the candidate routes, the scenery on the roads along the candidate routes, rates of car jackings along the candidate routes, and an availability of gas stations along the candidate routes.

In some embodiments, if the received mode of transportation is an electric-powered vehicle, the plurality of factors important to the user comprises conditions of the roads along the candidate routes, a number and severity of car accidents on the roads along the candidate routes, the scenery on the roads along the candidate routes, the rates of car jackings along the candidate routes, an availability of electric charging stations along the candidate routes, a cost of the electric charging stations along the candidate routes, and a charging speed of the electric charging stations along the candidate routes.

In some embodiments, if the received mode of transportation is walking, the plurality of factors important to the user comprises conditions of the roads along the candidate routes, a number and severity of accidents to walkers on the roads along the candidate routes, the scenery on the roads along the candidate routes, and rates of muggings along the candidate routes. In some embodiments, if the received mode of transportation is walking, the plurality of factors important to the user comprises rates of murders along the plurality of candidate routes, rates of violent crimes along the plurality of candidate routes, rates of thefts along the plurality of candidate routes, rates of rapes along the plurality of candidate routes, rates of kidnappings along the plurality of candidate routes, an availability of police stations along the candidate routes, an availability of water along the candidate routes, an availability of food along the candidate routes, an availability of sidewalks along the candidate routes, an availability of crosswalks along the candidate routes, and an available of traffic lights at intersections along the candidate routes.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 6 is a diagram of an exemplary interface for providing route guidance.

DETAILED DESCRIPTION OF INVENTION

Figure 1:
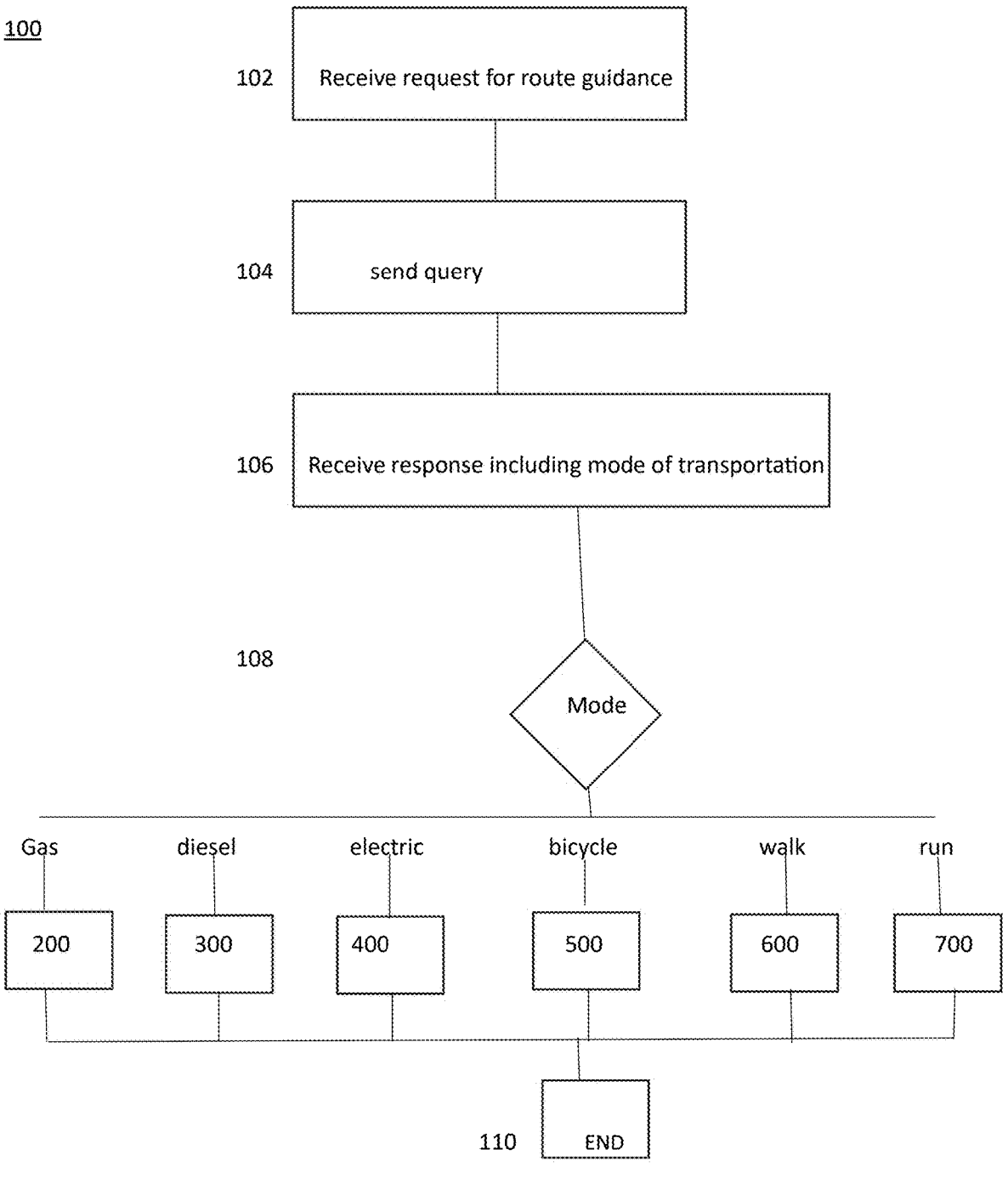
FIG. 1 shows a method for determining the type of vehicle for which route guidance is requested, according to some embodiments.

Conventional route guidance products fail to consider various factors that are important to travellers and fail to tailor the route guidance to the particular preferences of an individual traveller. Rather, these conventional products typically consider only an estimated travel time and toll fees and provide the same route suggestions to all users, regardless of their individual circumstances or preferences.

Deficiencies exist with these conventional route guidance products. They fail to consider the characteristics of the traveller's means for transportation. For example, a person driving a gas-powered car that will run out of gas in forty miles will prefer a route that passes close to a gas station in about thirty to forty miles. A person driving a diesel-powered car that will run out of fuel in sixty miles will prefer a route that passes close to a station selling diesel fuel. A person driving an electric powered car that will run out of charge in one hundred miles will prefer a route that passes closes to an electric charging station in about eighty to one hundred miles. Yet conventional products and services do not consider the amount of fuel or electric charge remaining in a vehicle in providing route guidance.

As another example, a person riding a bicycle will prefer a route that has a bicycle lane, has less vehicle traffic, fewer traffic lights to prevent the need to stop and start frequently, lower crime rates, lower accident rates, water fountains nearby, air stations nearby, and bicycle repair shops nearby. Moreover, different bicycle riders may place different importance on these different factors. Yet conventional products and services do not consider these factors or the individual preferences of different bicycle riders in providing route guidance.

As another example, a person walking will prefer a route that has crosswalks, sidewalks, traffic lights allowing pedestrians to cross a street, lower crime rates, etc. Moreover, different walkers may place different importance on these different factors. Yet conventional products and services do not consider these factors in providing route guidance to a walker.

To address these and other problems with conventional route guidance products, the techniques described herein provide route guidance, based on an individual traveller's preferences, the type of vehicle, and various safety and other factors. For example, some embodiments of the present invention consider the amount of gas available in a gas-powered automobile in suggesting routes that pass near a gas station before the automobile is expected to run out of gas. Some embodiments of the present invention consider the amount of diesel fuel remaining in a diesel-powered automobile in suggesting routes that pass near a station selling diesel fuel before the automobile is expected to run out of gas. Some embodiments of the present invention consider the amount of charge available in the batteries of an electric powered automobile in suggesting routes that pass near an electric charging station before the automobile is expected to run out of charge. Some embodiments consider the condition of the roads in suggesting routes that avoid roads that are covered with ice, snow, potholes, etc. or are under construction. Some embodiments may consider the presence of red-light cameras, the presence of speed detecting equipment, the frequency with which traffic tickets are given to motorist by policemen on different roads, etc. Some embodiments of the present invention consider the individual preferences of each different user including the amount of importance the user places on these different factors.

As another set of examples, some embodiments of the present invention consider the presence of bicycle lanes in suggesting routes to a bicyclist. Other embodiments consider the amount of vehicular traffic in suggesting routes to a bicyclist who may want to avoid routes with heavy motor vehicle traffic. Other embodiments consider the severity and frequency of accidents such as those in which bicyclists are hit by motor vehicles in suggesting routes to a bicyclist who may want to avoid routes where bicyclists are injured by motor vehicles. Other embodiments consider the frequency of traffic lights and/or stop signs in suggesting routes to a bicyclist who may want to avoid frequent stops and starts, which require more energy and effort. Other embodiments may consider the availability of water fountains in suggesting routes to a bicyclist who is on a long trip and cannot carry enough water. Other embodiments may consider the availability of bicycle repair shops in suggesting routes to a bicyclist who may not have knowledge or equipment to do bicycle repair and may be dependent on others to make repairs. Other embodiments may consider the severity and frequency of crimes against bicyclists such as muggings in suggesting routes to a bicyclist who may be fearful of getting attacked. Other embodiments may consider the frequency of bicycle thefts in suggesting routes to a bicyclist who may wish to stop along the route to eat or rest and is concerned that the bicycle may be stolen when it is not in use even if it is locked. Some embodiments of the present invention may consider the amount of importance the user places on these different factors.

As another set of examples, some embodiments of the present invention may consider the presence of crosswalks and traffic lights that stop motor vehicle traffic to allow pedestrians to cross the street in suggesting routes to walkers who may be concerned with safety, particularly elderly or physically handicapped people who require more time to cross a street. Other embodiments may consider the presence of sidewalks in suggesting routes to walkers who may be uncomfortable walking along the side of a road with a sidewalk. Other embodiments may consider the frequency and severity of crimes against pedestrians in suggesting routes to walkers who may be fearful of getting mugged and robbed. Some embodiments of the present invention may consider the amount of importance the use places on these different considerations.

In the following description, numerous specific details are set forth regarding the systems and methods of the disclosed subject matter and the environment in which such systems and methods may operate, etc., in order to provide route guidance that considers an individual traveler's preference, the type of vehicle, safety and other factors, etc. In addition, it will be understood that the examples provided below are exemplary, and that it is contemplated that there are other systems and methods that are within the scope of the disclosed subject matter.

FIG. 1 shows a method 100 for determining the type of vehicle for which route guidance is requested, according to some embodiments. In step 102, a request for route guidance is received. In step 104, a query is sent to a user's device asking for a starting location, an ending location, an identification of the mode of transportation (e.g., gas powered vehicle, diesel powered vehicle, electric powered vehicle, bicycle, walking), the importance placed on various traveling factors by the traveler, etc. In some embodiments, the importance placed on the various factors include numerical importance ratings of various factors including condition of the roads (e.g., wet, icy, snowy, dry), the number and severity of car accidents, scenery, crime rates, availability of fuel, availability of water fountains, etc. In step 106, a response is received indicating the mode of transportation. In step 108, a determination is made as to which process to execute based on the indication of the mode of transportation. If it is determined in step 108 that the mode of transportation is a gas-powered vehicle, control proceeds to the process 200 of FIG. 2. If it is determined in step 108 that the mode of transportation is a diesel-powered vehicle, control proceeds to process 300 of FIG. 3. If it is determined in step 108 that the mode of transportation is an electric powered vehicle, control proceeds to process 400 of FIG. 4. If it is determined in step 106 that the mode of transportation is a bicycle, control proceeds to process 500 of FIG. 5. If it is determined in step 108 that the mode of transportation is walking, control proceeds to process 600 of FIG. 6. If it is determined in step 108 that the mode of transportation is running, control proceeds to process 700 of FIG. 7. After completion of one of the processes in FIG. 2, 3, 4, 5, 6, or 7, control proceeds to step 110, where the process 100 terminates.

Figure 2:
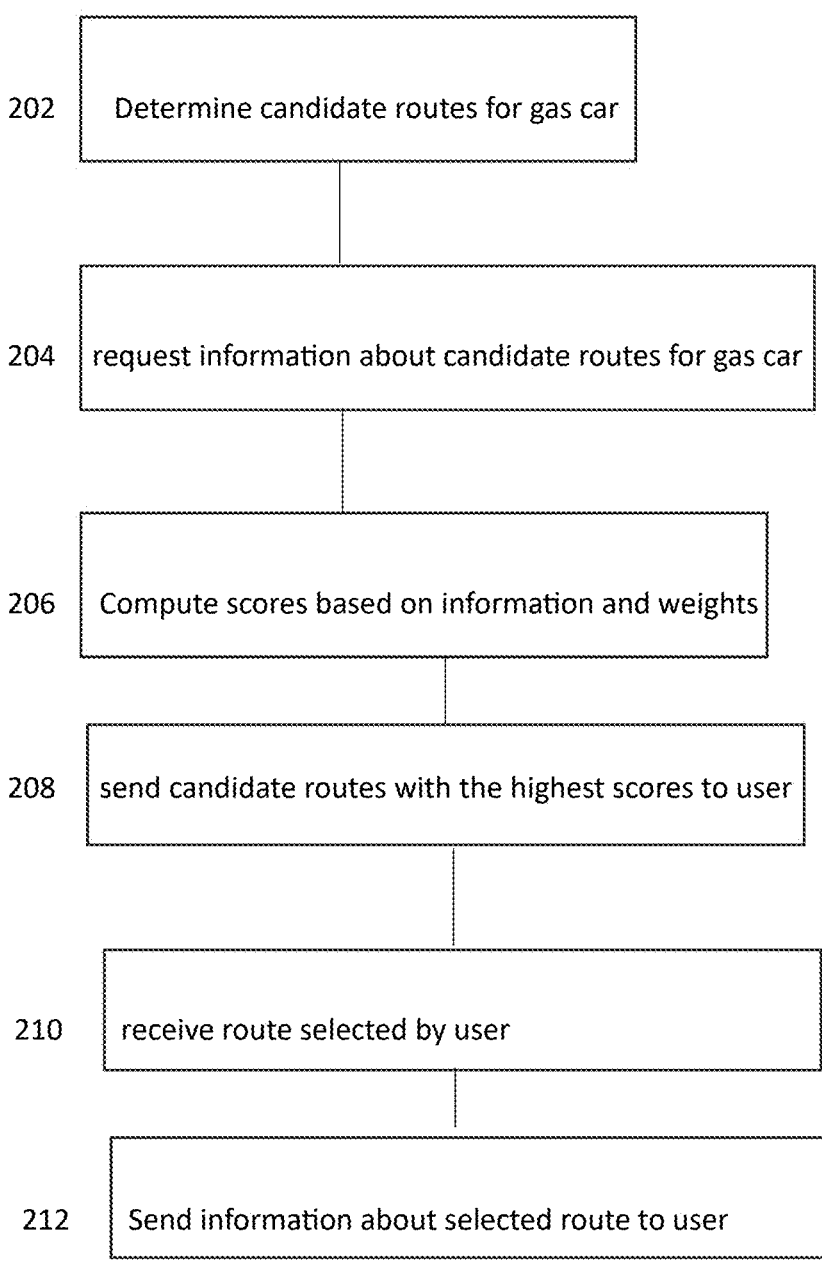
FIG. 2 shows a method for providing route guidance to a person driving a gas-powered vehicle, according to some embodiments.

FIG. 2 shows a method 200 for providing route guidance to a person driving a gas-powered vehicle, according to some embodiments. In step 202, a set of candidate routes in the vicinity of the starting location and ending location are determined. In step 204, information about the candidate routes is requested such as the conditions of the roads along the candidate routes (e.g., wet, icy, snowy, dry), the number and severity of car accidents on the roads along the candidate routes, the scenery on the roads along the candidate routes, the crime rates (e.g., car jackings) along the candidate routes, the availability of gas along the candidate routes, etc. In step 206, a utility score is computed for one or more of the candidate routes based on the information about the candidate routes and the level of importance placed on the various factors of this information by the traveler in step 102 of process 100. In some embodiments, the utility score is a function of the various factors weighted by the respective level of importance placed on the factors by the traveler. In step 208, a subset of the candidate routes having the highest utility scores are sent to the traveler. In step 210, a selection of one of the subset of routes is received from the traveler. In step 212, information about the selected route is sent to the traveler. In some embodiments, the information about the selected route includes an identification of the roads on the selected route, the restaurants along the route, rest areas on the route, gas stations along the route, etc. Control then proceeds to step 108 of process 100.

Figure 3:
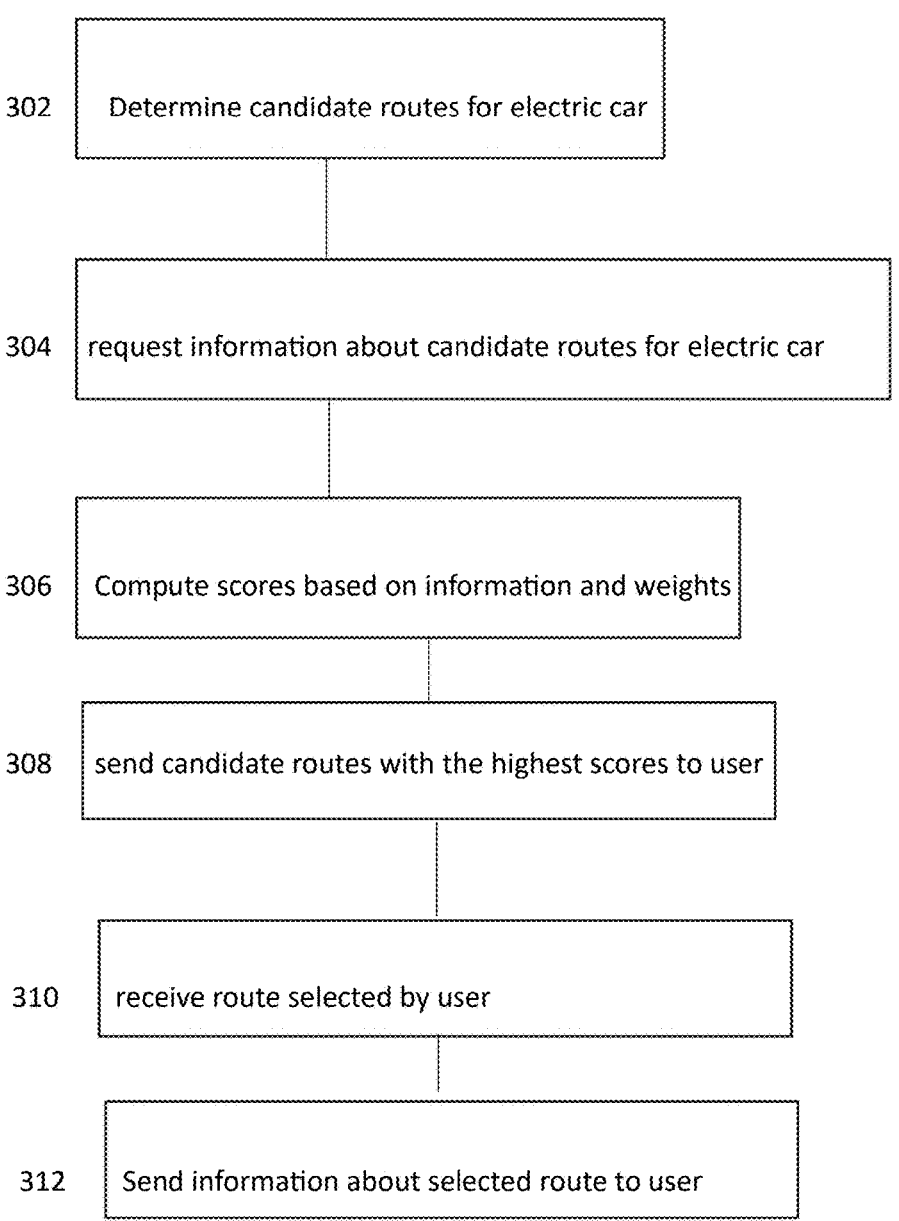
FIG. 3 shows a method for providing route guidance to a person driving an electric vehicle, according to some embodiments.

FIG. 3 shows a method for providing route guidance to a person driving an electric vehicle, according to some embodiments. In step 302, a set of candidate routes in the vicinity of the starting location and ending location are determined. In step 304, information about the candidate routes is requested such as the conditions of the roads along the candidate routes (e.g., wet, icy, snowy, dry), the number and severity of car accidents on the roads along the candidate routes, the scenery on the roads along the candidate routes, the crime rates (e.g., car jackings) along the candidate routes, the availability of charging stations along the candidate routes, etc. In step 306, a utility score is computed for one or more of the candidate routes based on the information about the candidate routes and the level of importance placed on the various factors of this information by the traveler in step 102 of process 100. In some embodiments, the utility score is a function of the various factors weighted by the respective level of importance placed on the factors by the traveler. In step 308, a subset of the candidate routes having the highest utility scores are sent to the traveler. In step 310, a selection of one of the subset of routes is received from the traveler. In step 312, information about the selected route is sent to the traveler. In some embodiments, the information about the selected route includes an identification of the roads on the selected route, the restaurants along the route, rest areas on the route, electric charging stations along the route, etc. Control then proceeds to step 108 of process 100.

Figure 4:
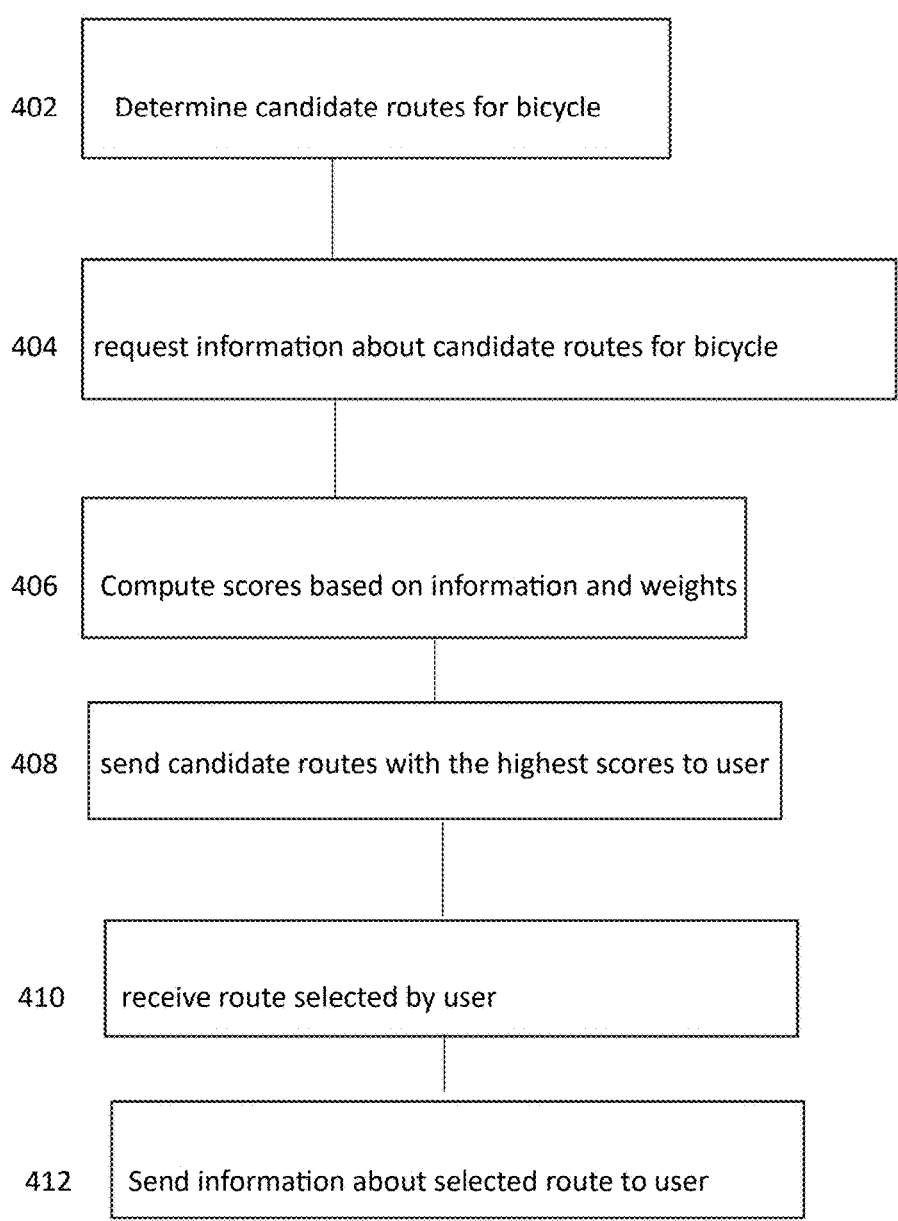
FIG. 4 shows a method for providing route guidance to a person riding a bicycle, according to some embodiments.

FIG. 4 shows a method for providing route guidance to a person riding a bicycle, according to some embodiments. In step 402, a set of candidate routes in the vicinity of the starting location and ending location are determined. In step 404, information about the candidate routes is requested such as the conditions of the roads along the candidate routes (e.g., wet, icy, snowy, dry), the number and severity of accidents to bicyclists on the roads along the candidate routes, the scenery on the roads along the candidate routes, the crime rates (e.g., muggings, stolen bicycles) along the candidate routes, the availability of bicycle repair stations along the candidate routes, the availability of air filling stations along the candidate routes, the availability of dedicated bicycle paths along the candidate routes, the availability of crosswalks along the candidate routes, the availability of traffic lights at intersections along the candidate routes, etc. In step 406, a utility score is computed for one or more of the candidate routes based on the information about the candidate routes and the level of importance placed on the various factors of this information by the traveler in step 102 of process 100. In some embodiments, the utility score is a function of the various factors weighted by the respective level of importance placed on the factors by the traveler. In step 408, a subset of the candidate routes having the highest utility scores are sent to the traveler. In step 410, a selection of one of the subset of routes is received from the traveler. In step 412, information about the selected route is sent to the traveler. In some embodiments, the information about the selected route includes an identification of the roads on the selected route, the restaurants along the route, rest areas on the route, bicycle repair stations along the route, air filling stations along the route, etc. Control then proceeds to step 108 of process 100.

Figure 5:
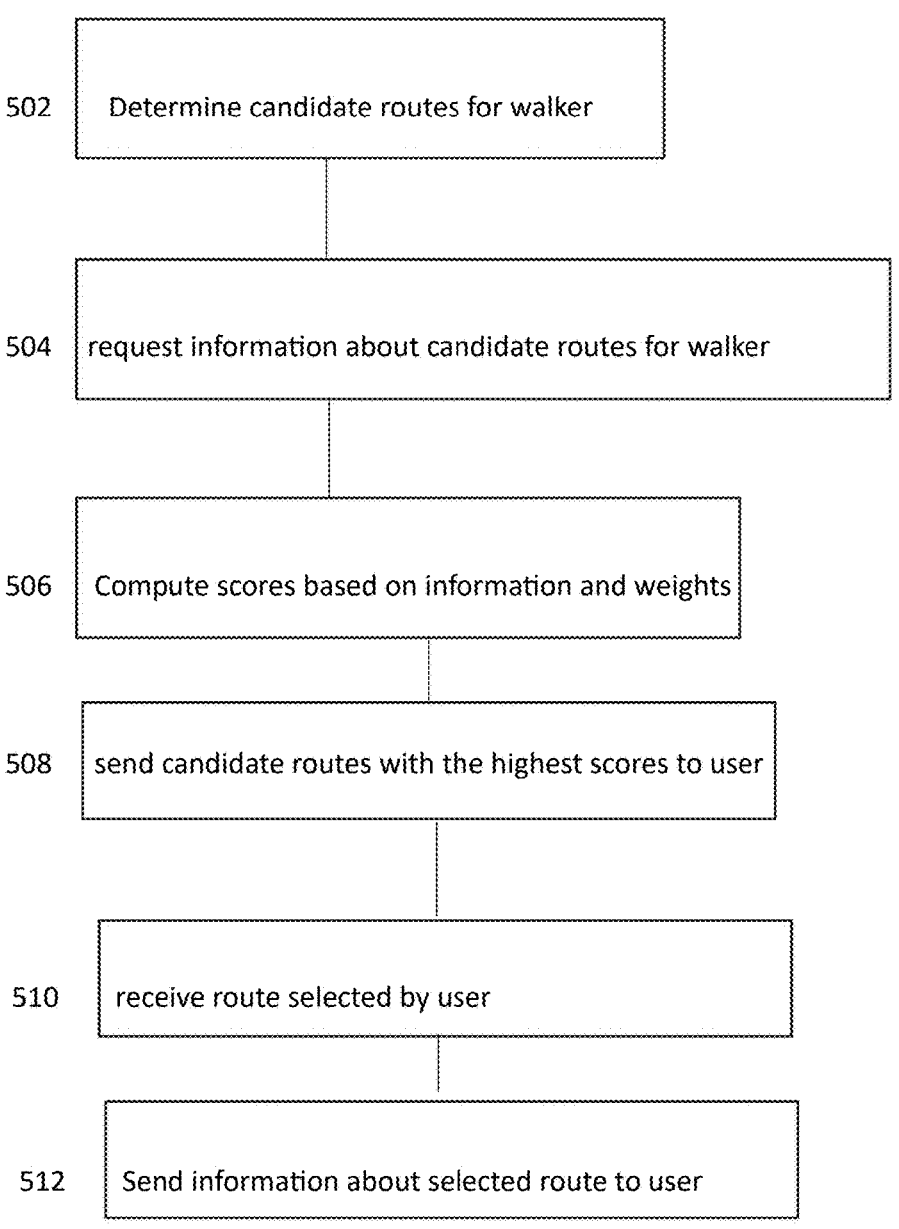
FIG. 5 shows a method for providing route guidance to a person walking, according to some embodiments.

FIG. 5 shows a method for providing route guidance to a person walking, according to some embodiments. In step 502, a set of candidate routes in the vicinity of the starting location and ending location are determined. In step 504, information about the candidate routes is requested such as the conditions of the roads along the candidate routes (e.g., wet, icy, snowy, dry), the number and severity of accidents to walkers on the roads along the candidate routes, the scenery on the roads along the candidate routes, the crime rates (e.g., muggings, murders, violent crimes, thefts, rapes, kidnappings) along the candidate routes, the availability of police stations along the candidate routes, the availability of water along the candidate routes, the availability of food along the candidate routes, the availability of sidewalks along the candidate routes, the availability of crosswalks along the candidate routes, the available of traffic lights at intersections along the candidate routes, etc. In step 506, a utility score is computed for one or more of the candidate routes based on the information about the candidate routes and the level of importance placed on the various factors of this information by the traveler in step 102 of process 100. In some embodiments, the utility score is a function of the various factors weighted by the respective level of importance placed on the factors by the traveler. In step 508, a subset of the candidate routes having the highest utility scores are sent to the traveler. In step 510, a selection of one of the subset of routes is received from the traveler. In step 512, information about the selected route is sent to the traveler. In some embodiments, the information about the selected route includes an identification of the roads on the selected route, the restaurants along the route, rest areas on the route, bicycle repair stations along the route, air filling stations along the route, etc. Control then proceeds to step 108 of process 100.

Figure 6:
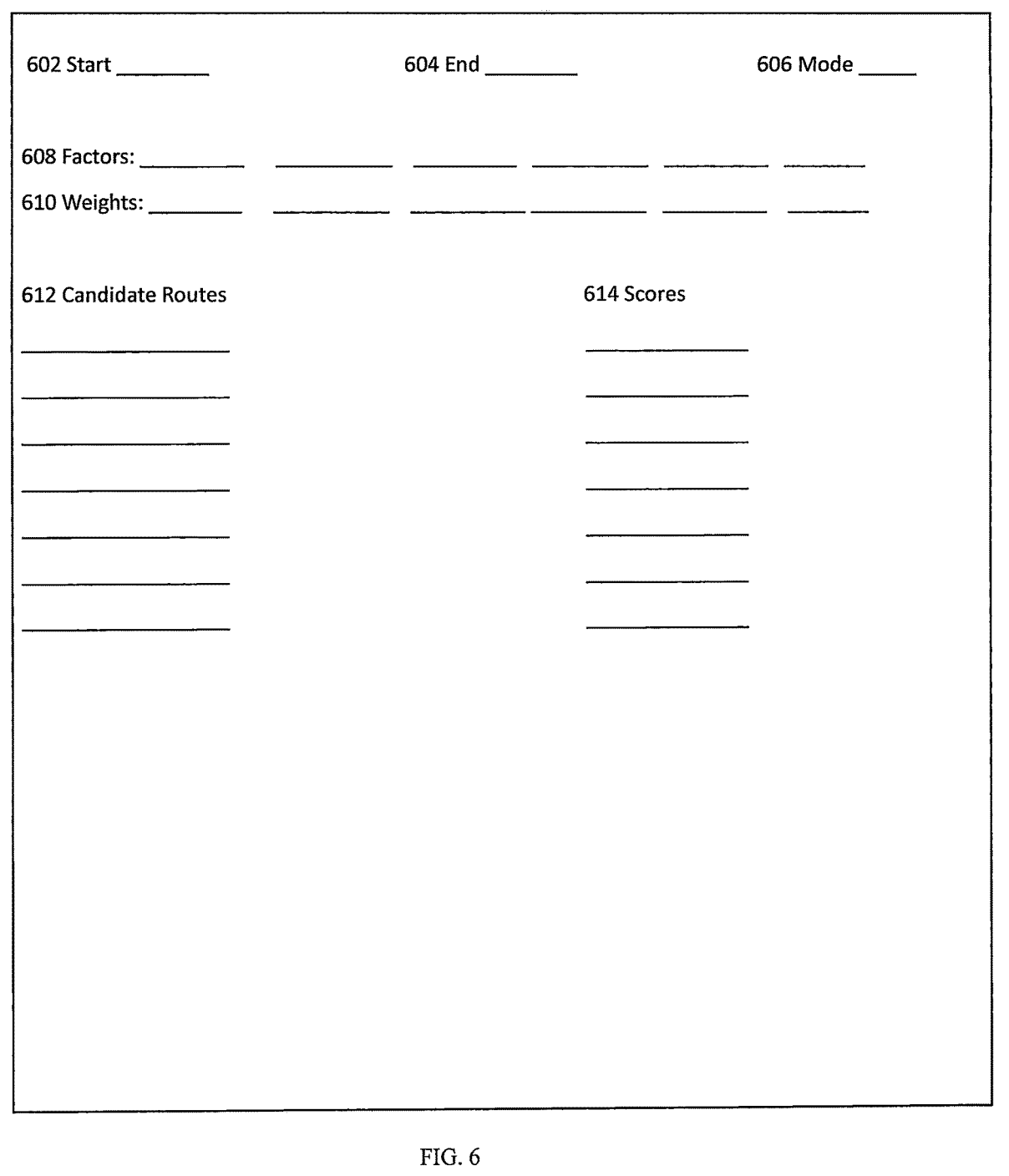

FIG. 6 is a diagram of an exemplary interface 600 for providing route guidance. In some embodiments, the interface 600 includes a first field receiving from the user a starting location 602; a second field receiving from the user an ending location 604; and a third field receiving from the user a mode of transportation 606 wherein the mode of transportation comprises one of the following: a gas-powered vehicle, a diesel-powered vehicle, an electric powered vehicle, a bicycle, and walking. In some embodiments, the interface 600 may include a plurality of fourth fields 608 receiving from the user a plurality of factors important to the user.

For example, if the received mode of transportation is a bicycle, the plurality of factors important to the user comprises conditions of roads along the candidate routes, a number and severity of accidents to bicyclists on the roads along the candidate routes, the scenery on the roads along the candidate routes, crime rates along the candidate routes, an availability of bicycle repair stations along the candidate routes, and an availability of air filling stations along the candidate routes.

In some embodiments, if the received mode of transportation is a bicycle, the plurality of factors important to the user further comprises an availability of dedicated bicycle paths along the candidate routes, an availability of water fountains along the candidate routes, an availability of crosswalks along the candidate routes, and an availability of traffic lights at intersections along the candidate routes.

In some embodiments, if the received mode of transportation is a gas-powered vehicle, the plurality of factors important to the user comprises the conditions of the roads along the candidate routes, a number and severity of car accidents on the roads along the candidate routes, the scenery on the roads along the candidate routes, rates of car jackings along the candidate routes, and an availability of gas stations along the candidate routes.

In some embodiments, if the received mode of transportation is an electric-powered vehicle, the plurality of factors important to the user comprises conditions of the roads along the candidate routes, a number and severity of car accidents on the roads along the candidate routes, the scenery on the roads along the candidate routes, the rates of car jackings along the candidate routes, an availability of electric charging stations along the candidate routes, a cost of the electric charging stations along the candidate routes, and a charging speed of the electric charging stations along the candidate routes.

In some embodiments, if the received mode of transportation is walking, the plurality of factors important to the user comprises conditions of the roads along the candidate routes, a number and severity of accidents to walkers on the roads along the candidate routes, the scenery on the roads along the candidate routes, and rates of muggings along the candidate routes. In some embodiments, if the received mode of transportation is walking, the plurality of factors important to the user comprises rates of murders along the plurality of candidate routes, rates of violent crimes along the plurality of candidate routes, rates of thefts along the plurality of candidate routes, rates of rapes along the plurality of candidate routes, rates of kidnappings along the plurality of candidate routes, an availability of police stations along the candidate routes, an availability of water along the candidate routes, an availability of food along the candidate routes, an availability of sidewalks along the candidate routes, an availability of crosswalks along the candidate routes, and an available of traffic lights at intersections along the candidate routes.

In some embodiments, the interface 600 may include a plurality of fifth fields receiving from the user a plurality of weights 610 corresponding to the plurality of factors important to the user; a plurality of sixth fields receiving from a server a plurality of candidate routes 612; and a plurality of seventh fields receiving from the server a plurality of utility scores 614 corresponding to the plurality of candidate routes. In some embodiments, a user may select at least one of the plurality of candidate routes.

It should be appreciated that exemplary naming conventions, abbreviations, and the like have been used to provide examples of the techniques described herein. Such conventions are not intended to be limiting and instead are intended to simply provide examples. Accordingly, it should be appreciated that the techniques can be implemented using other conventions, abbreviations, and/or the like.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionalities may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the prin- ciples described herein. Accordingly, the foregoing description and drawings are by way of example only.

What is claimed is:

1. An electronic device for providing route guidance comprising at least one processor, at least one non-transient memory electrically connected to said processor, a communication interface electrically connected to said processor, and at least one display operatively engaged with the processor and configured to display an interface to a user wherein the interface includes:

a first field receiving from the user a starting location;

a second field receiving from the user an ending location;

a third field receiving from the user a mode of transportation wherein the mode of transportation comprises one of the following: a gas-powered vehicle, a diesel-powered vehicle, an electric powered vehicle, a bicycle, and walking;

a plurality of fourth fields receiving from the user a plurality of factors wherein the plurality of factors comprises conditions of roads along a plurality of candidate routes, a number and severity of accidents to bicyclists on the roads along the candidate routes, the scenery on the roads along the candidate routes, crime rates along the candidate routes, an availability of bicycle repair stations along the candidate routes, and an availability of air filling stations along the candidate routes;

a plurality of fifth fields receiving from the user a plurality of weights corresponding to the plurality of factors;

said at least one display further configured to:

send to the at least one processor the starting location, the ending location, the mode of transportation, the plurality of factors and the corresponding plurality of weights;

said at least one processor configured to:

receive from the at least one display the starting location, the ending location, the mode of transportation, the plurality of factors and the corresponding plurality of weights;

transmit the starting location, the ending location, the mode of transportation, the plurality of factors and the corresponding plurality of weights via the communication interface;

receive the plurality of candidate routes and a plurality of utility scores corresponding to the plurality of candidate routes via the communication interface; and transmit the plurality of candidate routes and the corresponding plurality of utility scores to the at least one display;

wherein the interface further includes;

a plurality of sixth displaying the plurality of candidate routes; and a plurality of seventh fields displaying the plurality of utility scores corresponding to the plurality of candidate routes;

said at least one display further configured to:

receive, from the user, a selection of at least one of the plurality of candidate routes; and display the selected candidate route to the user.

2. The electronic device for providing route guidance of claim 1 wherein the plurality of factors further comprises an availability of dedicated bicycle paths along the candidate routes, an availability of water fountains along the candidate routes, an availability of crosswalks along the candidate routes, and an availability of traffic lights at intersections along the candidate routes.

3. The electronic device for providing route guidance of claim 1 wherein the plurality of factors comprises the conditions of the roads along the candidate routes, a number and severity of car accidents on the roads along the candidate routes, the scenery on the roads along the candidate routes, rates of car jackings along the candidate routes, and an availability of gas stations along the candidate routes.

4. The electronic device for providing route guidance of claim 1 wherein the plurality of factors comprises conditions of the roads along the candidate routes, a number and severity of car accidents on the roads along the candidate routes, the scenery on the roads along the candidate routes, the rates of car jackings along the candidate routes, an availability of electric charging stations along the candidate routes, a cost of the electric charging stations along the candidate routes, and a charging speed of the electric charging stations along the candidate routes.

5. The electronic device for providing route guidance of claim 1 wherein the plurality of factors comprises conditions of the roads along the candidate routes, a number and severity of accidents to walkers on the roads along the candidate routes, the scenery on the roads along the candidate routes, and rates of muggings along the candidate routes.

6. The electronic device for providing route guidance of claim 5 wherein the plurality of factors comprises rates of murders along the plurality of candidate routes, rates of violent crimes along the plurality of candidate routes, rates of thefts along the plurality of candidate routes, rates of rapes along the plurality of candidate routes, rates of kidnappings along the plurality of candidate routes, an availability of police stations along the candidate routes, an availability of water along the candidate routes, an availability of food along the candidate routes, an availability of sidewalks along the candidate routes, an availability of crosswalks along the candidate routes, and an available of traffic lights at intersections along the candidate routes.

7. An electronic device for providing route guidance to a user having different modes of transportation comprising at least one processor, and at least one non-transient memory electrically connected to said processor, and at least one display operatively engaged with the processor, said processor configured to:

send, to the user, a query requesting a starting location, an ending location, an identification of the mode of transportation wherein the mode of transportation comprises one of the following: a gas-powered vehicle, a diesel-powered vehicle, an electric powered vehicle, a bicycle, and walking;

said at least one display configured to:

display a plurality of fields for receiving from the user the starting location, the ending location, the identification of the mode of transportation:

receive, from the user, the starting location, the ending location and the identification of the mode of transportation;

transmit to said at least one processor the starting location, the ending location, and the identification of the mode of transportation;

said at least one processor further configured to:

determine a plurality of candidate routes between the starting location and the ending location;

said at least one display further configured to:

receive, from the user, a plurality of factors; and transmit, to said at least one processor, the plurality of factors:

wherein the plurality of factors comprises conditions of roads along the candidate routes, a number and severity of accidents to bicyclists on the roads along the candidate routes, the scenery on the roads along the candidate routes, crime rates along the candidate routes, an availability of bicycle repair stations along the candidate routes, and an availability of air filling stations along the candidate routes;

said at least one display further configured to:

receive, from the user, a plurality of weights corresponding to the plurality of factors;

transmit, to said at least one processor, the plurality of weights;

said at least one processor further configured to:

determine a plurality of values corresponding to the plurality of factors;

determine a plurality of scores corresponding to the plurality of candidate routes by evaluating a utility function as product of the plurality of values of the plurality of factors and the corresponding plurality of weights;

send the plurality of scores corresponding to the plurality of candidate routes to said at least one display;

said at least one display further configured to:

receive the plurality of scores corresponding to the plurality of candidate routes;

display the plurality of scores corresponding to the plurality of candidate routes;

receive a selection of one of the plurality of candidate routes from the user; and display the selected route to the user.

8. The electronic device for providing route guidance of claim 7 wherein the plurality of factors further comprises an availability of dedicated bicycle paths along the candidate routes, an availability of water fountains along the candidate routes, an availability of crosswalks along the candidate routes, and an availability of traffic lights at intersections along the candidate routes.

9. The electronic device for providing route guidance of claim 7 wherein the plurality of factors comprises the conditions of the roads along the candidate routes, a number and severity of car accidents on the roads along the candidate routes, the scenery on the roads along the candidate routes, rates of car jackings along the candidate routes, and an availability of gas stations along the candidate routes.

10. The method electronic device for providing route guidance of claim 7 wherein the plurality of factors comprises conditions of the roads along the candidate routes, a number and severity of car accidents on the roads along the candidate routes, the scenery on the roads along the candidate routes, the rates of car jackings along the candidate routes, an availability of electric charging stations along the candidate routes, a cost of the electric charging stations along the candidate routes, and a charging speed of the electric charging stations along the candidate routes.

11. The electronic device for providing route guidance of claim 7 wherein the plurality of factors comprises conditions of the roads along the candidate routes, a number and severity of accidents to walkers on the roads along the candidate routes, the scenery on the roads along the candidate routes, and rates of muggings along the candidate routes.

12. The electronic device for providing route guidance of claim 11 wherein the plurality of factors comprises rates of murders along the plurality of candidate routes, rates of violent crimes along the plurality of candidate routes, rates of thefts along the plurality of candidate routes, rates of rapes along the plurality of candidate routes, rates of kidnappings along the plurality of candidate routes, an availability of police stations along the candidate routes, an availability of water along the candidate routes, an availability of food along the candidate routes, an availability of sidewalks along the candidate routes, an availability of crosswalks along the candidate routes, and an available of traffic lights at intersections along the candidate routes.

* * * * *